United States Patent [19]

Yan et al.

[11] Patent Number: 5,129,140
[45] Date of Patent: Jul. 14, 1992

[54] CUTTER EXCHANGING APPARATUS INCORPORATED IN A MACHINE

[75] Inventors: Hong-Sen Yan, Tainan; Chih-Wen Yiou, Chang-Hua Hsien; Pei-Chen Chao, Hsin-Ying, all of Taiwan

[73] Assignee: Leadwell CNC Machines Mfg., Corp., Taipei, Taiwan

[21] Appl. No.: 763,940

[22] Filed: Sep. 23, 1991

[51] Int. Cl.$^5$ ............................................. B23Q 3/157
[52] U.S. Cl. ......................................... 483/45; 483/7; 414/735; 414/738
[58] Field of Search ............... 29/568; 414/226, 735, 414/736, 738

[56] References Cited

U.S. PATENT DOCUMENTS

| | | | |
|---|---|---|---|
| 3,616,526 | 11/1971 | Tajima | 29/568 |
| 3,704,510 | 12/1972 | Sedgwick et al. | 29/568 |
| 4,372,728 | 2/1983 | Murakami | 414/735 X |
| 4,384,397 | 5/1983 | Nelson | 29/568 |

Primary Examiner—Z. R. Bilinsky
Attorney, Agent, or Firm—Merchant, Gould, Smith, Edell, Welter & Schmidt

[57] ABSTRACT

A cutter exchanging apparatus includes a cam mechanism mounted on a driving shaft of the apparatus. The cam mechanism includes a cylindrical roller and a plate attached together. The cylindrical roller has a first and second end, and an endless recessed cam groove that includes an upper circumferential recessed cam groove formed adjacent to the first end, a lower circumferential recessed cam groove formed adjacent to the second end and two transition gradually curved cam groove, each connected to each of two free ends of the upper and lower circumferential recessed cam groove. The plate has a recessed groove that includes a starting point formed adjacent to the center point of rotation of the plate and an ending point. The recessed groove includes a first section that has a predetermined distance increasing in diameter with respect to the center of rotation of the plate beginning from the starting point to a first point in the recessed cam groove and a second section that has another distance decreasing in diameter from the center of rotation of the plate beginning from the first point to the ending point.

3 Claims, 8 Drawing Sheets

CUTTER EXCHANGING APPARATUS INCORPORATED IN A MACHINE

BACKGROUND OF THE INVENTION

1. FIELD OF INVENTION

This invention relates to a cutter exchanging apparatus, more particularly to a computerized cutter exchanging apparatus incorporated in a machine and in which a cam mechanism is applied to achieve the cutter exchanging purpose.

2. DESCRIPTION OF THE RELATED ART

A conventional computerized cutter exchanging apparatus to be incorporated in a machine includes a driving device to rotate a cam mechanism rigidly mounted on a driving shaft thereby to rotate a driven shaft connected to said cam mechanism by a connecting rod. One end of the driven shaft holds an arm for exchanging a cutter. In order for the driven shaft to be rotated and simultaneously moved axially a plurality of cam mechanisms and driving mechanism are applied, thus increasing the cost of manufacturing and making said cutter exchanging apparatus more complicated. Further when said cam mechanism is needed to be machined in an electric discharge machine, it is not easy to dismantle said cam mechanism from the driving shaft on which it is mounted.

SUMMARY OF THE INVENTION

Therefore, it is an main object of the present invention to provide a cutter exchanging apparatus to be used in conjunction with a machine which has a simplified construction.

Another object of the present invention is to provide a cutter exchanging apparatus which uses a single cam with two different recessed grooves formed thereon in which two cam followers are disposed. The movement of these cam followers in the recessed grooves can urge a driven shaft to rotate and therefore to complete a cutter exchanging purpose.

Accordingly, a cutter exchanging apparatus of the present invention includes a support frame in which a driving shaft and a driven shaft above and parallel to said driving shaft are respectively mounted. A cam mechanism that includes a cylindrical roller and a plate is rigidly mounted on the driving shaft. The cylindrical roller has a first end and a second end attached to a first side of the plate cam. The driven shaft includes a first hollow shaft having one end extending out from the support frame on which an arm with clamping member at its two free ends, is centrally mounted and an inner shaft. A second end of the hollow shaft is sleeved slidably on the inner shaft. An engaging means provided between the first hollow shaft and the inner shaft permit said hollow shaft to rotate with the inner shaft and simultaneously permits the hollow shaft to slide thereon. A guiding roller is fixed to the hollow shaft in the support frame adjacent to the second end of the hollow shaft. A toothed wheel is fixed to the inner shaft distal from the guiding roller. An endless recessed cam groove is formed on the outer surface of the cylindrical roller and a recessed cam groove is formed on the second side of the plate, extending from a point adjacent to the center of rotation of the plate. A connecting rod has one end pivoted to the bottom of the support frame and the other end movably connected to the guiding roller of the first hollow shaft and an intermediate portion formed between the two ends. The intermediate portion of the connecting rod has a first cam follower, which is movably received in the endless recessed cam groove of the cylindrical roller. A guiding path is disposed in the support frame. A serrated rack has one end meshed with the toothed wheel of the inner shaft of the driven shaft, is slidably provided in the guiding path. The other end of the serrated rack has a second cam follower which is movably received in the recessed cam groove of the plate. When the driving shaft is driven, the cylindrical roller and the plate rotate thereby moving the first and second cam followers respectively in the endless recessed cam groove and the recessed cam groove. The movement of the second cam follower moves the serrated rack up and down in the guiding path, hence the inner shaft rotates. The movement of the first cam follower urges the connecting rod to pivot about the pivot point, hence sliding the hollow shaft slidably on the inner shaft. Correspondingly, the arm rotates on the inner shaft. A sensing device disposed in the support frame can automatically control the axial movement of the hollow shaft and the driving device.

BRIEF DESCRIPTION OF THE DRAWINGS

Other features and advantages of the present invention will become more apparent in the following detailed description, including drawings, all of which shows a non-limiting form of the invention, and of which.

DETAILED DESCRIPTION OF THE PREFERRED EMBODIMENT

Figure 1:
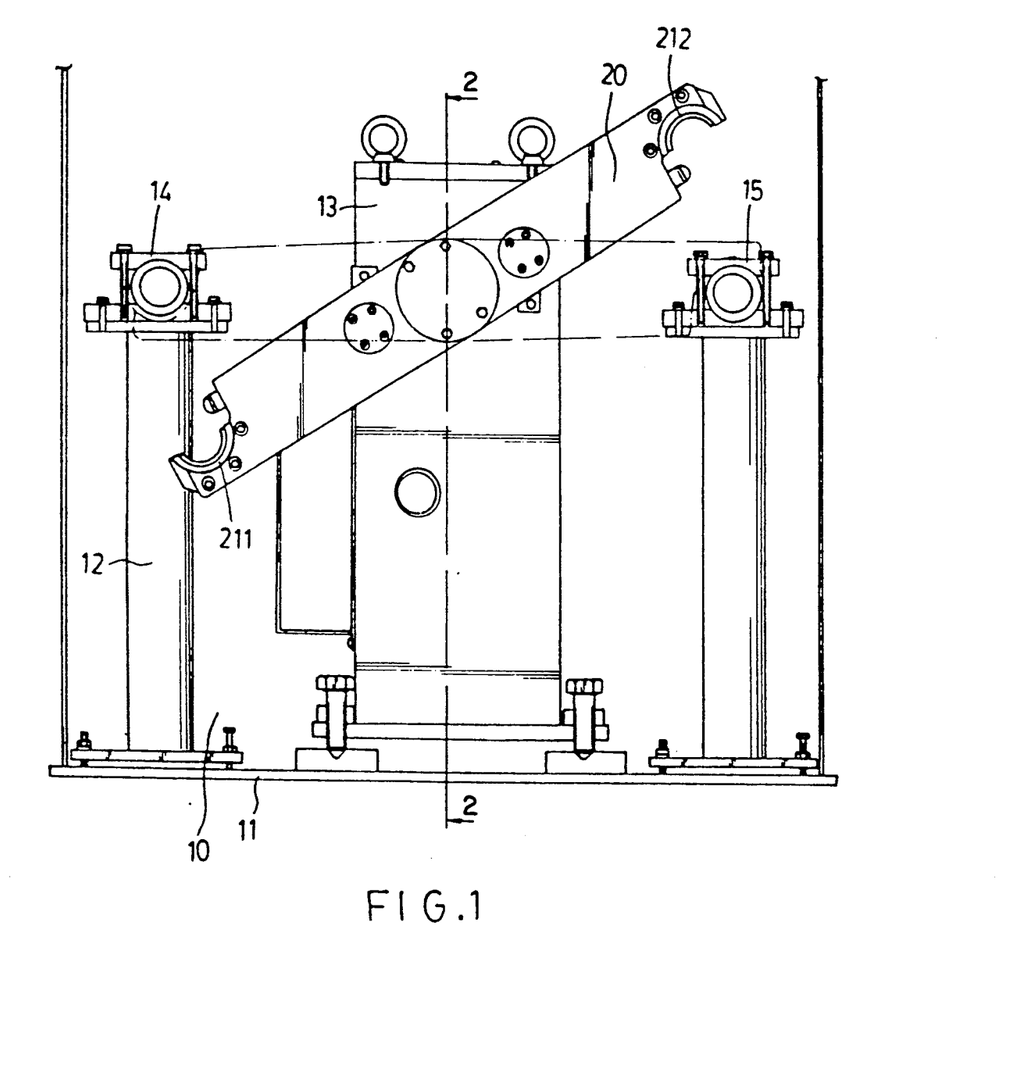
FIG. 1 is a perspective, schematic view of a cutter exchanging apparatus of the present invention.
Figure 2:
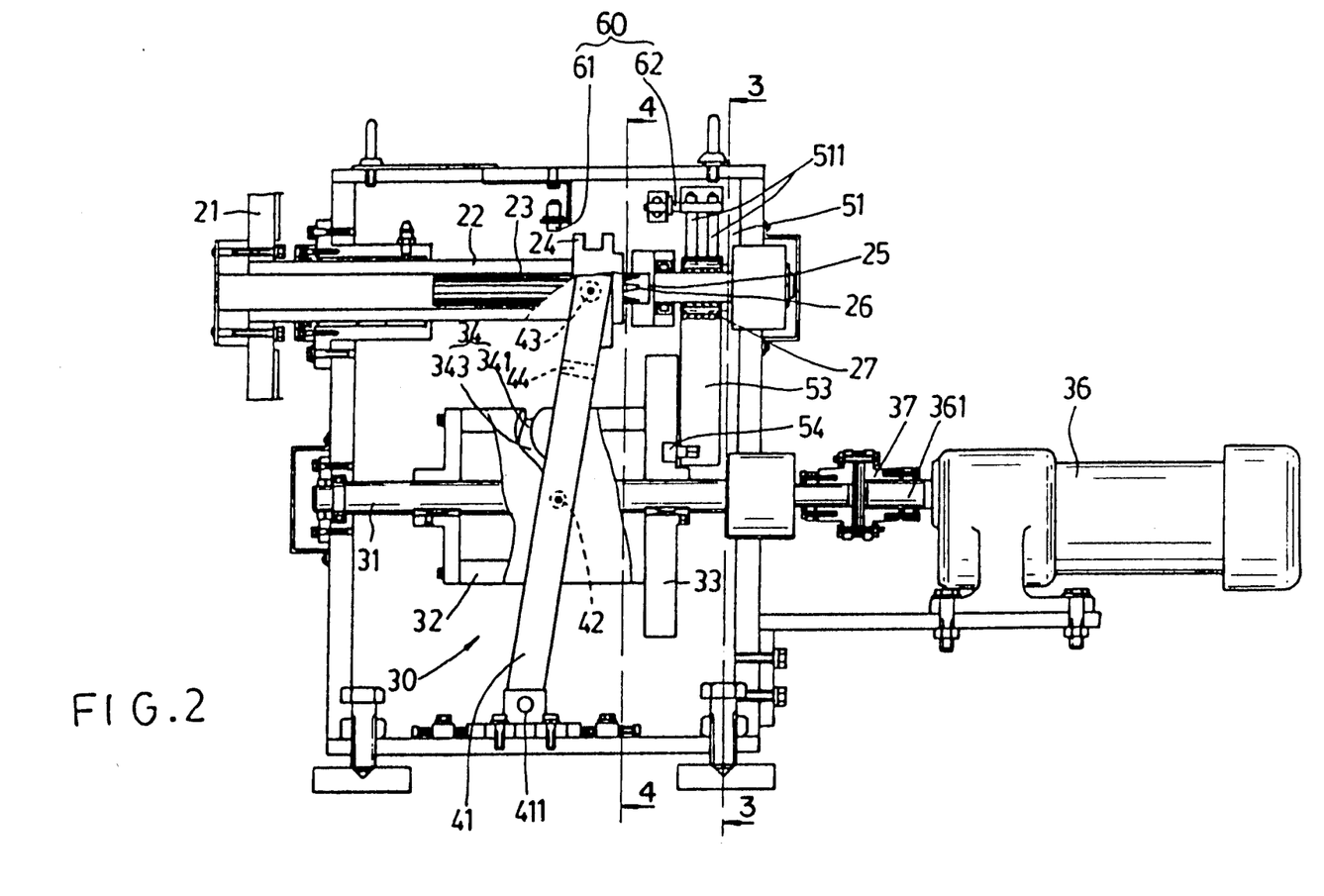
FIG. 2 is another perspective view of the cutter exchanging apparatus of FIG. 1 taken along the line 2—2.

Referring to FIGS. 1 and 2, the cutter exchanging apparatus according to the present invention includes a support frame 10, an arm for exchanging cutters 20, a cam mechanism 30, a connecting rod 40, a serrated rack 50 and a sensing device 60.

The support frame 10 is mounted in a machine 11 between a cutter storage room 12 and a casing 13 as in other conventional computerized cutter exchanging apparatus. The support frame 10 includes a top end, a bottom end, a front wall and a rear wall.

A driven shaft is journalled in the support frame 10 adjacent to its top end of the same. The driven shaft includes a hollow shaft 22 having a first end extending out from the support frame, and a second end sleeved on an inner shaft 25. An engaging device, such as a castallated splinted key 26, is provided between the hollow shaft 22 and the inner shaft 25 by a known related art that the inner shaft can rotate with the hollow shaft 22 and simultaneously permit said hollow shaft to slide thereon.

An arm 20 with clamping members 211, 212 respectively at its two free ends, is centrally fixed to the first end of the hollow shaft 22. A guiding roller 24 is fixed securely on the hollow shaft 22 adjacent to the second end of the same. The guiding roller 24 has a circumferential recess 241 formed thereon. A toothed wheel 27 is rigidly mounted on the inner shaft 25 distal from the guiding roller 24.

Figure 5:
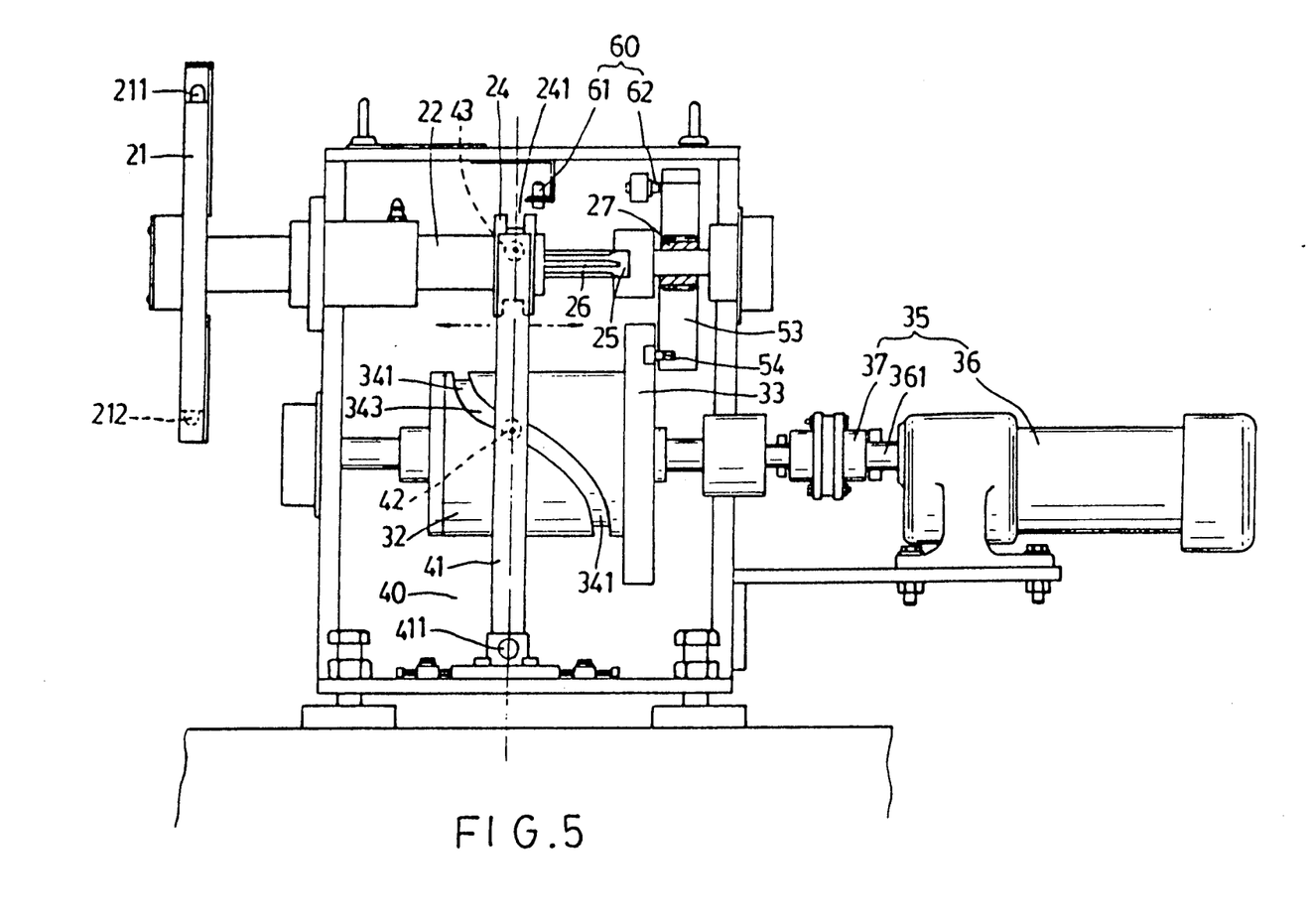
FIG. 5 is a perspective view of the cylindrical cam of the preferred embodiment of the present invention.
Figure 6:
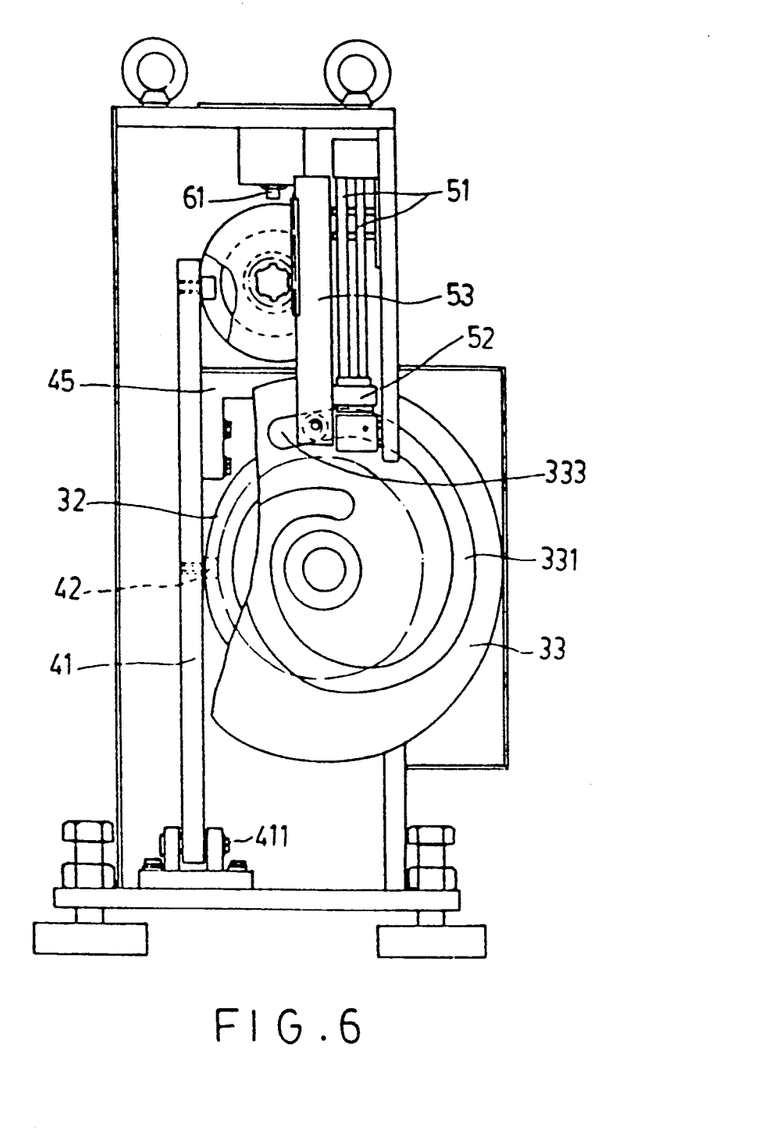
FIG. 6 is a perspective view of the plate cam of the preferred embodiment of the present invention shown in a anti-clockwise rotation.

A driving shaft 31 on which a cam mechanism is mounted, is journalled in the support frame 10 below the driven shaft. A driving device 36, usually a motor, that includes a clutch assembly 37 and a shaft 361 connected to the driving shaft for driving the same. The cam mechanism 30 includes a cylindrical roller 32 and a plate 33. The cylindrical roller 32 has a first end, a second end attached removably to a first side of the plate 33. An endless recessed cam groove 34 is formed around its outer surface of the cylindrical roller 32 and includes a first and second circumferential recessed cam groove 341 respectively formed adjacent to the first and second end of the cylindrical roller and two transition gradually curved cam groove 343 formed between the first and second circumferential recessed cam grooves 341.

Figure 3:
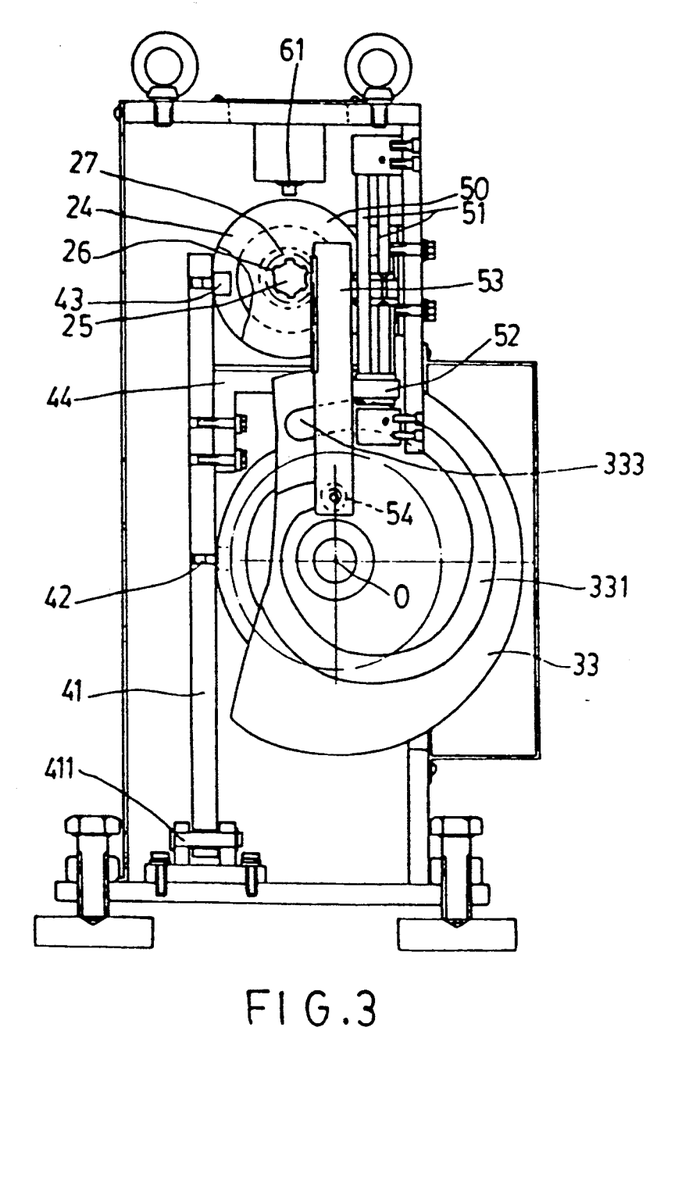
FIG. 3 is a cross sectional view of the cutter exchanging apparatus of FIG. 2 taken along the line 3-3.

Referring to FIG. 3, the second side of the plate 33 has a recessed cam groove 331 formed thereon, which includes a starting point formed adjacent to the center "0" of rotation of the plate 33 and an ending point.

Figure 4:
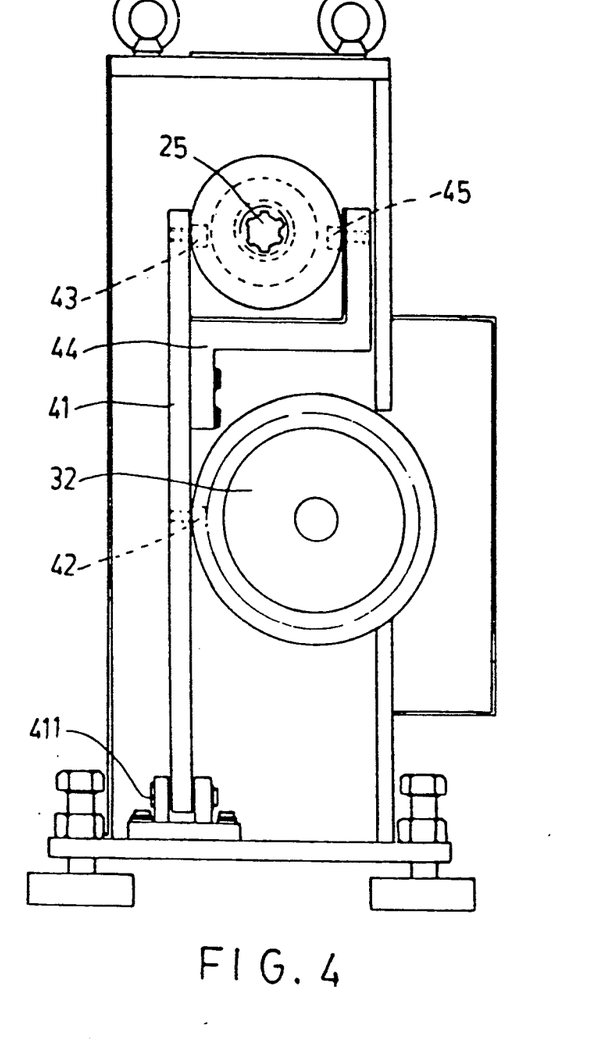
FIG. 4 is a cross sectional view of the cutter exchanging apparatus of FIG. 2 taken along the line 4—4.

Referring to FIGS. 2 and 4, a connecting rod 41 has one end 411 connected pivotally to the bottom of the support frame 10. The other end of the connecting rod 41 is bifurcated to be a fork end 44 with two wheels 43, 45 extending inwardly thereof. When the fork end 44 is connected to the guiding roller 24 of the hollow shaft 22, the two wheels extend into the circumferential recess 241 of the guiding roller 24 thereby engaging the connecting rod 41 to the hollow shaft 22. The intermediate portion of the connecting rod 41 has a first cam follower 42 which is movably received in the endless recessed cam groove 34 of the cylindrical roller 32.

A pair of spaced ribs 511 defining a guiding path 51 between them, is vertically fixed on the rear wall of the support frame 10. A rack 53 having one serrated side meshed with the toothed wheel 27 of the inner shaft and an insertion piece 52 projecting perpendicularly from the other side that extends into the guiding path 51, is provided in the support frame 10. The other end of the rack 53 has a second cam follower 54 which is movably received in the recessed groove 331 of the plate 33. Because of the insertion piece 52, the rack 53 can move up and down in the support frame 10.

Under this condition, the center of rotation "0" of the plate 33 is below and vertically aligned with the serrated rack 53, and the starting point originates from above the center of rotation "0" of the plate and the ending point is above and substantially aligned with the starting point and the center of rotation "0". The recessed cam groove 331 of the plate includes a first section of a first predetermined distance increasing in diameter with respect to the center point of the plate, beginning from the starting point to a first point in the recessed cam groove 331 and a second section that has a second predetermined distance with a constant diameter beginning from the first point to a second point and a third section that has a third predetermined distance decreasing in diameter with respect to the center point of the plate beginning from the second point to the ending point.

It is important to observe here that when the driving shaft 31 is rotated, the second cam follower 54 travels in the recessed groove 31 from the starting point to the ending point. When the second cam follower 54 reaches the ending point, the driving shaft 31 has rotated 360 degrees from its initial position, by which time the serrated rack 53 has traveled to the uppermost position in the guiding path 51.

A computerized control unit 60 is disposed in the support frame 10 that includes a first sensing device 61 which can sense the guiding roller 24 when it is moved axially to an extreme position from its original position and a second sensing device 62 that can sense the rack 53 when it has reached to an uppermost point in the guiding path 51, then automatically ordering the driving means 36 to stop and change its rotation direction.

FIG. 1 shows the cutter exchanging apparatus of the present invention after assembled. Under such condition, the two clamp members 212, 211 of the arm 20 is in an inclined position with respect to the cutter storage room 14 and the cutter assembly 15 of the machine 11. It is important to note that extracting the cutter from the cutter assembly 15, and taking a new one from the storage room 14 and replacing the used one are all done simultaneously while the driving shaft 31 is rotated in a first direction. When the driving shaft 31 is rotated in a second direction, opposite the first direction, the exchanging also takes place. The direction of the rotation of the driving shaft is controlled by the computerized unit.

When the driving shaft 31 is driven to rotate about its own axis by the driving means 36, the first and second cam followers 42, 54 travel in the endless recessed cam groove 34 of the cylindrical roller 32 and the recessed cam groove 331 of the plate 33. The movement of the first cam follower urges the connecting rod 41 to pivot about the pivot point 411, hence moving the guiding roller 24 and correspondingly the hollow shaft 22 slides out and later retracts back into the support frame 10. The movement of the second cam follower 54 urges the rack 53 to slide up and down in the guiding path 51, hence rotating the inner 22 and hollow shaft 25 Thus the arm 20 rotatingly extends out and retracts back to its original position. The exchange of the cutter is accomplished during extension and retracting of the cutter exchanging arm 20.

Figure 8:
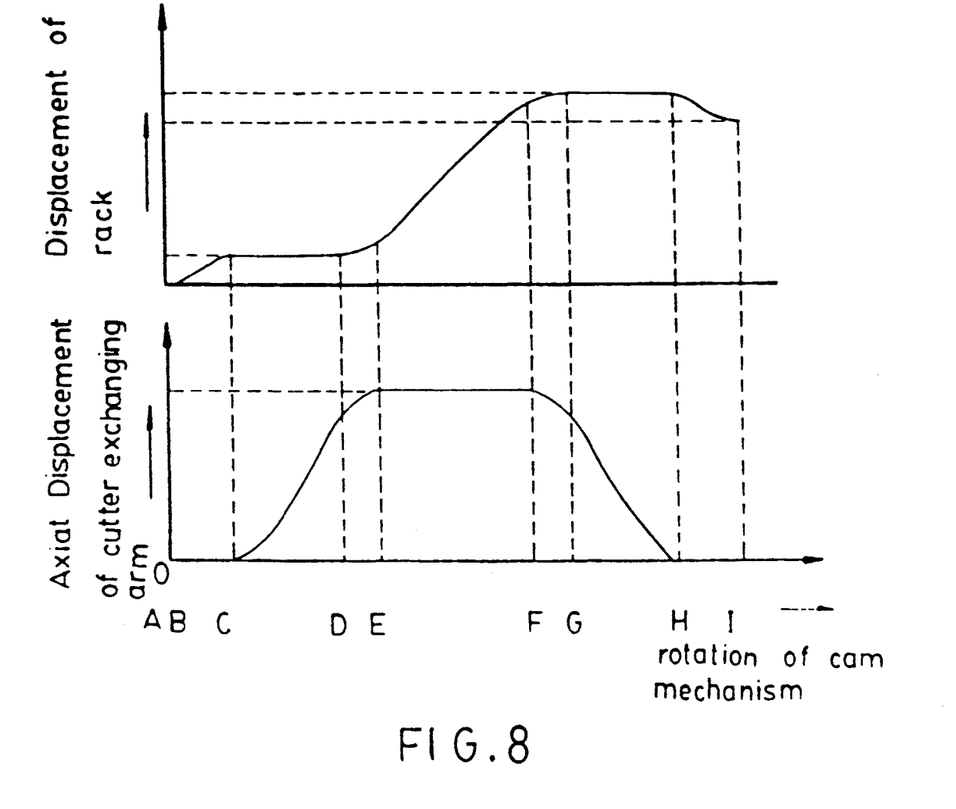
FIG. 8 is a graph diagram illustrating the rotation of the cylindrical cam and the plate cam with respect to the axial movement of the driven shaft on which the cutter exchanging arm of the present invention is mounted.

For further clarification of the operation of the cutter exchanging apparatus, a graph in FIG. 8, represents the displacement of the rack 53 and the axial displacement of the cutter exchanging arm 20. After assembly, the first cam follower 42 is at a point intermediate of the first and second circumferential recessed cam groove 341. The second cam follower 54 is at the starting point adjacent to the center of rotation "0" of the plate 33. When the driving shaft 31 is driven to rotate in a clockwise direction about 30 degrees, the first cam follower travels from A point to C point within the circumferential recessed cam groove 341, hence there is no movement of the cutter exchanging arm 20. However, displacement of the rack 53 due to the second cam follower 54 rotates the cutter exchanging arm 20 to be in an aligned position ready to clamp the cutter from the machine and a new one from the storage room. The first and second cam followers further travel from the point C to a point D, the cutter exchanging arm rotatingly extends outward from the support frame 10, extracting the cutter and the new one respectively from the machine and the storage room, by which time the driving shaft 31 has rotated about 180 degrees. The movement of the first and second cam followers from the point D-E-F-G-H retract the cutter exchanging arm 20 back toward the support frame 10 during which time exchanging of the old and new one is completed, by which time the driving shaft 31 is rotated about 270. The further movement of the first and second cam followers 42, 54 in the endless recessed cam groove 34 and the recessed cam groove 331 bring said cutter exchanging arm 20 back to its original position. During which time, the first cam follower 42 travel in the circumferential recessed cam groove 341 of the endless recessed cam groove which correspondingly causes the hollow shaft no axial movement on the inner shaft, the travel of the second cam follower 54 in the second section of the recessed cam groove 331 urges the cutter exchanging arm 20 back to its initial position, by which time the driving shaft 31 is rotated 360 degrees, whereat the exchanging arm inclined about 30 degrees with respect to an imaginary line drawn across the center of the cutter exchanging arm 20 parallel to the bottom of the support frame 10.

Figure 7:
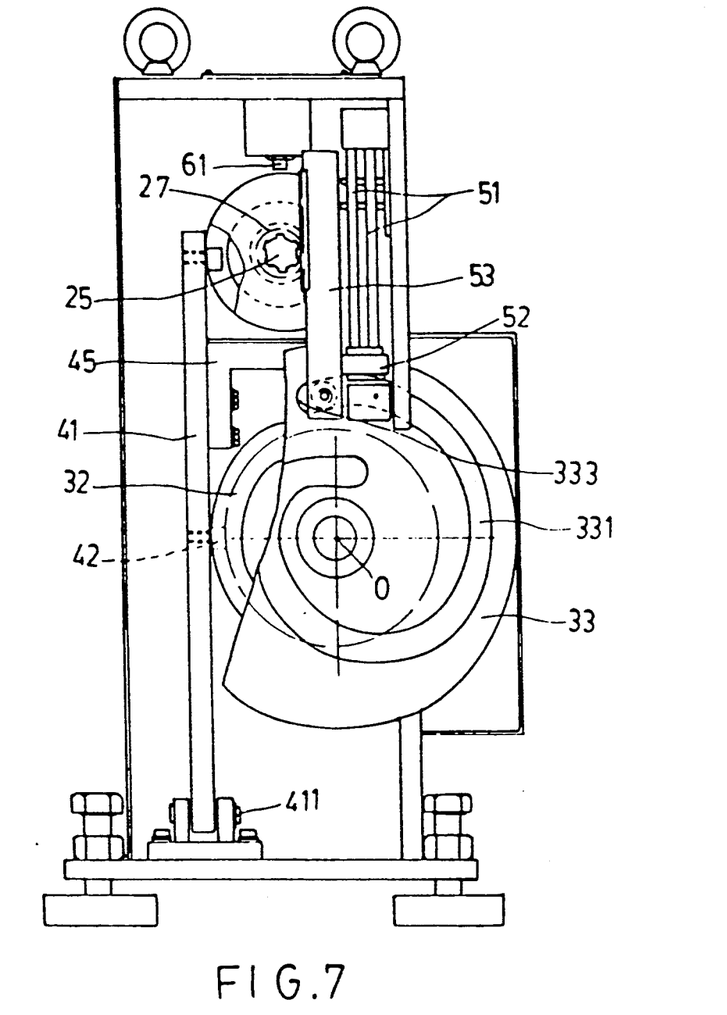
FIG. 7 is a perspective view of the plate cam of the preferred embodiment of the present invention shown in a clockwise rotation.

On sensing the completion of the cutter exchanging operation, the computerized controlled unit order the driving device 36 to stop. By then, the second cam follower 54 is at the ending point in the second section of the recessed cam groove 331 of the plate 33, as shown in FIG. 7.

The computerized controlled unit 60 can automatically actuate the driving device 36 to rotate the driving shaft 31 in anti-clockwise direction, during which time a cutter exchanging operation takes place a second time as already stated manner in the above explanation.

While the invention has been explained in connection with what is considered to be the most practical and preferred embodiment, the invention is not to be limited only to the disclosure, but on the contrary, it is intended to cover various modifications and equivalent arrangements within the interpretation of the scope and spirit of the present invention, so as to encompass all such modifications and equivalent arrangements.

We claim:

1. A cutter exchanging apparatus incorporated in a machine includes a support frame having a top, a bottom, a front and rear wall, and a cam mechanism mounted on a driving shaft jounrnalled between said front and rear walls of said support frame, and a driving device connected to and for driving said driving shaft to rotate said cam mechanism, a driven shaft mounted in said support frame above and parallel to said driving shaft, said driven shaft including a hollow shaft and an inner shaft, said hollow shaft having a first end extending out from said front wall of said support frame and a second end sleeved on said inner shaft, an arm with clamping member at its two free end thereof is centrally fixed to said first end of said hollow shaft, an engaging unit connecting said hollow shaft and said inner shaft to rotate together and permiting with said hollow shaft to slide on said inner shaft;

characterized in that a guiding roller is fixed to said hollow shaft adjacent to said second end of said hollow shaft and a toothed wheel is fixed to said inner shaft distal from said guiding roller;

said cam mechanism includes a cylindrical roller and a plate, said cylindrical roller having a first end and a second end removably attached to a first side of said plate, said plate having a second side opposite to said first side, said cylindrical roller having an endless recessed cam groove formed therearound on its outer surface including an upper and a lower circumferential recessed cam groove formed respectively adjacent to said first and second end of said cylindrical roller and two transition gradually inclined cam grooves, each being connected to one of two free ends of said upper and lower circumferential recessed cam groove and said second side of said plate having a center of rotation and a recessed cam groove including a starting point formed adjacent to said center of rotation of said plate and an ending point;

a connecting rod having a first end pivoted to said bottom of said support frame, a second end of said connecting rod being movably connected to said guiding roller of said first hollow shaft and an intermediate portion between said first and second end, said intermediate portion of said connecting rod having a first cam follower movably received in said peripheral endless recessed groove of said cylindrical roller;

a guiding path fixed vertically on said rear wall of said support frame;

a serrated rack having one end meshed with said gear wheel of said inner shaft, said serrated rack being slidably provided in said guiding path and the other end of said serrated rack having a second cam follower mounted thereto which being movably received in said recessed cam groove of said plate, said center of rotation of said plate being below and vertically aligned with said serrated rack, said starting point of said recessed cam groove terminating above said center of rotation point of said plate and said ending point terminating above and substantially aligned with said starting point and said center of rotation of said plate, said plate being rotated 360 degree with respect to its initial position when second cam follower of said connecting rod is moved from said starting point to said ending point in said recessed cam groove;

said driving shaft being driven to rotate by said driving device, said cylindrical roller and said plate rotate, moving said first and second cam followers respectively in said endless recessed cam groove and said recessed cam groove, the movement of said second cam follower correspondingly moving said serrated rack up and down in said guiding path to rotate said driven shaft about its own axis, said arm correspondingly rotates and simultaneously the movement of said first cam follower urging said connecting rod to pivot about said pivot point and correspondingly moving said first hollow shaft to slide on said inner shaft; and a sensing unit disposed in said support frame to sense the axial movement of said first hollow shaft and automatically control said driving device.

2. A cutter exchanging apparatus as claimed in claim 1, characterized in that said guiding roller has a circumferential recess formed thereon, said first end of said connecting rod is a fork end having two projections, said guiding roller being sandwiched by said fork end with said two projections being received in said circumferential recess.

3. A cutter exchanging device as claimed in claim 1, characterized in taht said recessed cam groove of said plate includes a first portion having a first predetermined distance increasing in diameter with respect to said center of rotation beginning from said starting point to a first point in said recessed cam groove and a second portion having a second predetermined distance with a constant diameter beginning from said first point to a second point and a third portion having a third predetermined distance decreasing in diameter with respect to said center of rotation beginning from said second point to said ending point.

* * * * *